(12) United States Patent
Hosoki (10) Patent No.: US 8,979,352 B2
(45) Date of Patent: Mar. 17, 2015

(54) ILLUMINATION DEVICE, DISPLAY DEVICE, AND TELEVISION RECEIVER DEVICE

(75) Inventor: Mitsuru Hosoki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/997,334

(22) PCT Filed: Dec. 22, 2011

(86) PCT No.: PCT/JP2011/079783

§ 371 (c)(1),
(2), (4) Date: Jun. 24, 2013

(87) PCT Pub. No.: WO2012/093595

PCT Pub. Date: Jul. 12, 2012

(65) Prior Publication Data

US 2013/0286294 A1    Oct. 31, 2013

(30) Foreign Application Priority Data

Jan. 7, 2011    (JP) .................................. 2011-002198

(51) Int. Cl.
*F21V 7/04*    (2006.01)
*F21V 8/00*    (2006.01)
*G02F 1/1333*    (2006.01)
*G02F 1/1335*    (2006.01)

(52) U.S. Cl.
CPC ............ *G02B 6/0091* (2013.01); *G02B 6/0068* (2013.01); *G02F 1/133308* (2013.01); *G02F 1/1336* (2013.01); *G02F 1/133603* (2013.01); *G02F 1/133608* (2013.01); *G02F 1/133615* (2013.01); *G02F 2001/133317* (2013.01); *G02F2001/133322* (2013.01); *G02F 2001/133325* (2013.01)
USPC .............................................. 362/634; 349/60

(58) Field of Classification Search
CPC .. G02B 6/0086; G02B 6/0088; G02B 6/0091; G02F 1/133308; G02F 2001/133317; G02F 2001/133322
USPC ................................ 362/632–634; 349/58, 60
See application file for complete search history.

(56) References Cited

U.S. PATENT DOCUMENTS

| 8,164,704 B2 * | 4/2012 | Kim et al. ........................ 349/58 |
| 2007/0279944 A1 | 12/2007 | Sakai |
| 2011/0069509 A1 * | 3/2011 | Lin et al. ........................ 362/607 |

FOREIGN PATENT DOCUMENTS

| JP | H8-262233 A | 10/1996 |
| JP | 4311454 B2 | 8/2009 |

OTHER PUBLICATIONS

U.S. Appl. No. 13/994,623, filed Jun. 14, 2013.

*Primary Examiner* — Jason Moon Han
(74) *Attorney, Agent, or Firm* — Chen Yoshimura LLP (57) ABSTRACT

A backlight device 24 according to the present invention includes: LED substrates 30; LED light sources 28 placed on the surfaces of the LED substrates 30; a light guide plate 20 having light-receiving surfaces 20a on the side faces, the plate being placed such that the LED light sources 28 and the light-receiving surfaces 20a face each other; a chassis 22 having a bottom plate and a plurality of side walls 22b, 22c, 22d, and 22d standing upright from the bottom plate, the chassis being open on a top side opposite to the bottom plate and storing at least the LED light sources 28 and the light guide plate 20; and spacer members 34 for regulating the gaps between the side walls and the light guide plate 20, the spacer members being made of an elastic material. The LED substrates 30 are placed along the surfaces of the side walls, and the spacer members 34 are placed in the corners between the adjacent side walls 22b, 22c, 22d, and 22d.

11 Claims, 10 Drawing Sheets

ILLUMINATION DEVICE, DISPLAY DEVICE, AND TELEVISION RECEIVER DEVICE

TECHNICAL FIELD

The present invention relates to an illumination device, a display device, and a television receiver.

BACKGROUND ART

In recent years, flat panel display devices that use flat panel display elements such as liquid crystal panels and plasma display panels are increasingly used as display elements for image display devices such as television receivers instead of conventional cathode-ray tube displays, allowing image display devices to be made thinner. Liquid crystal panels used in liquid crystal display devices do not emit light on their own, and therefore, it is necessary to provide a separate backlight device as an illumination device. A known example of such a backlight device is an edge light-type backlight device in which a light-receiving surface is provided on a side face of a light guide plate, and a light source such as an LED is provided facing the side face of the light guide plate.

Patent Document 1 discloses an edge light-type backlight device provided with a structure that sets the position of the light guide plate. In this backlight device, a light-receiving surface is provided on one side face of the light guide plate, and a light source substrate is provided only at the one side face of the light guide plate. Elastic spacers are provided respectively between the light source substrate and the light guide plate, on both sides of the light source substrate. In this backlight device, the gap between the light source substrate and the light guide plate is set by the elastic spacers, thereby setting the position of the light guide plate.

RELATED ART DOCUMENT

Patent Document

Patent Document 1: Japanese Patent No. 4311454

Problems to be Solved by the Invention

There are cases in which light sources are provided for all of the side faces of the light guide plate in order to increase brightness. However, if light sources are provided for all of the side faces of the light guide plate in the backlight device of Patent Document 1, this requires at least eight elastic spacers, which increases the number of parts needed.

SUMMARY OF THE INVENTION

The present invention was made taking into account the above-mentioned problem. An object of the present invention is to provide a technique in which the position of the light guide plate can be set with a simple configuration in an edge light-type illumination device in which light sources are disposed around all of the side faces of the light guide plate.

Means for Solving the Problems

The technique disclosed in the present specification relates to an illumination device, including: light source substrates; light sources disposed on a surface of each of the light source substrates; a light guide plate having light-receiving surfaces on side faces thereof, the light guide plate being disposed such that the light sources and the light-receiving surfaces face each other; a storage member having a bottom plate and a plurality of side walls rising upwardly from the bottom plate, the storage member being open on a top side opposite to the bottom plate and storing at least the light source substrates and the light guide plate; and a plurality of spacer members that are made of an elastic material and that respectively set gaps between the plurality of side walls of the storage member and the light guide plate, wherein each of the light source substrates is disposed on each inner surface of the plurality of side walls, and wherein the spacer members are disposed at corners of the side walls that are adjacent to each other.

According to the above-mentioned illumination device, each gap between the light guide plate and each side wall of the storage member is controlled by the spacer members, which allows the position of the light guide plate in the storage member to be set. Each spacer member is made of an elastic material, and thus, if the light guide plate undergoes thermal expansion, this change in size in each side face of the light guide plate due to thermal expansion is absorbed by each spacer member. Also, each spacer member is disposed in a corner between adjacent side walls, and thus, it is possible to dispose light sources around all side faces of the light guide plate, storing the light sources between each of the spacer members, and it is possible to set the position of the light guide plate by four spacer members. Thus, it is possible to set the position of the light guide plate with a simple configuration while realizing an edge light-type illumination device in which the light sources are disposed around all of the side faces of the light guide plate.

A configuration may be used wherein gaps between the respective side faces of the light guide plate and the respective side walls of the storage member are equal, and wherein the spacer members are made of a material having a deformation amount of 0.5 mm or less when a weight of the light guide plate is applied on the spacer members disposed respectively at corners on both ends of one of the side walls.

If the weight of the light guide plate is applied on one set of spacer members, then the spacer members are compressed, and the gap between a side face of the light guide plate and the light sources on the side where the weight of the light guide plate is applied on the spacer members, and the gap between a side face of the light guide plate and the light sources on the opposite side of the light guide plate become unequal, and thus, the light-receiving efficiency also becomes unequal. If the light-receiving efficiency becomes unequal, then there is a difference in brightness on the display surface. In order for this difference in brightness to be difficult to perceive by human eyes, it is preferable that the difference in brightness be within 5%. In general, if the gap between the side face of the light guide plate and the light sources widens by 1 mm, the light-receiving efficiency decreases by 5%. According to the configuration above, it is possible to have the difference in brightness in the display surface between the side on which the weight of the light guide plate is applied and the side on the opposite side of the light guide plate be within 5%, when the weight of the light guide plate is applied on one set of spacer members. As a result, it is possible to have the difference in brightness on the display surface when the weight of the light guide plate is applied on a set of spacer members be difficult to perceive.

A configuration may be used wherein gaps between the respective side faces of the light guide plate and the respective light sources disposed on the respective side walls of the storage member are 0.5 mm or less, and wherein the spacer members are made of a material such that the deformation amount of the spacer members is less than the gaps between the respective side faces of the light guide plate and the respective light sources.

According to this configuration, it is possible to prevent or mitigate damage to the light sources and the light guide plate due to a side face of the light guide plate and the light sources coming into contact with each other on the side on which the weight of the light guide plate is applied.

Projections protruding towards the light guide plate and in contact with the light guide plate may be disposed on portions of the spacer members facing the light guide plate.

According to this configuration, the projections of the spacer members are in contact with the light guide plate, and thus, the light guide plate can be installed with ease in the space surrounded by the spacer members when manufacturing the illumination device.

The projections may have inclined faces that are on a plane inclined from the respective side walls towards the light guide plate.

According to this configuration, it is possible to use the inclined faces as a guide for installing the light guide plate when installing the light guide plate in the space surrounded by the spacer members, when manufacturing the illumination device. Thus, the light guide plate can be installed with greater ease.

The projections may have a contact surface in contact with a surface of the light guide plate.

According to this configuration, it is possible to effectively set the position of the light guide plate by having the projections of the spacer members be in contact with the surface of the light guide plate.

A configuration may be used wherein the spacer members have extensions that extend along plate surfaces of the light source substrates, and wherein a portion of each of the extensions is in contact with a surface of each of the light source substrates, thereby supporting each of the light source substrates.

According to this configuration, it is possible to support the light source substrates using the spacer members.

Substrate support members that support the light source substrates may be further included.

According to this configuration, it is possible to support the light source substrates by the substrate support members in an excellent manner.

The substrate support members may have an L shape in a cross-sectional view.

According to this configuration, it is possible to attach a light source substrate to one plate surface of the L-shaped substrate support member, and to attach the other plate surface to the bottom plate of the storage member.

The techniques disclosed in the present specification may be a display device that includes a display panel that displays images using light from the above-mentioned illumination device.

In a display device having an upper and lower direction matching a direction perpendicular to a thickness direction of the light guide plate, a vertical length of the spacer members disposed on a lower side of the light guide plate may be greater than a vertical length of the spacer members disposed on an upper side of the light guide plate.

According to this configuration, even if the weight of the light guide plate is applied on the spacer members disposed below the light guide plate, it is possible to have uniform gaps between the light guide plate and the light source substrates around the light guide plate.

A display device that uses a liquid crystal panel that uses liquid crystal as the display panel is novel and is useful. A television receiver that includes the above-mentioned display device is also novel and is useful. With the above-mentioned display device and television, it is possible to attain a greater area for the display region.

Effects of the Invention

According to the techniques disclosed in the present specification, it is possible to set the position of the light guide plate with a simple configuration in an edge light-type illumination device in which light sources are disposed around all side faces of the light guide plate.

DETAILED DESCRIPTION OF EMBODIMENTS

Embodiment 1

Embodiment 1 will be described with reference to the drawings. Each of the drawings indicates an X axis, a Y axis, and a Z axis in a portion of the drawings, and each of the axes indicates the same direction for the respective drawings. The Y axis direction corresponds to the vertical direction and the X axis direction corresponds to the horizontal direction. Unless otherwise noted, "up" and "down" in the description is based on the vertical direction.

Figure 1:
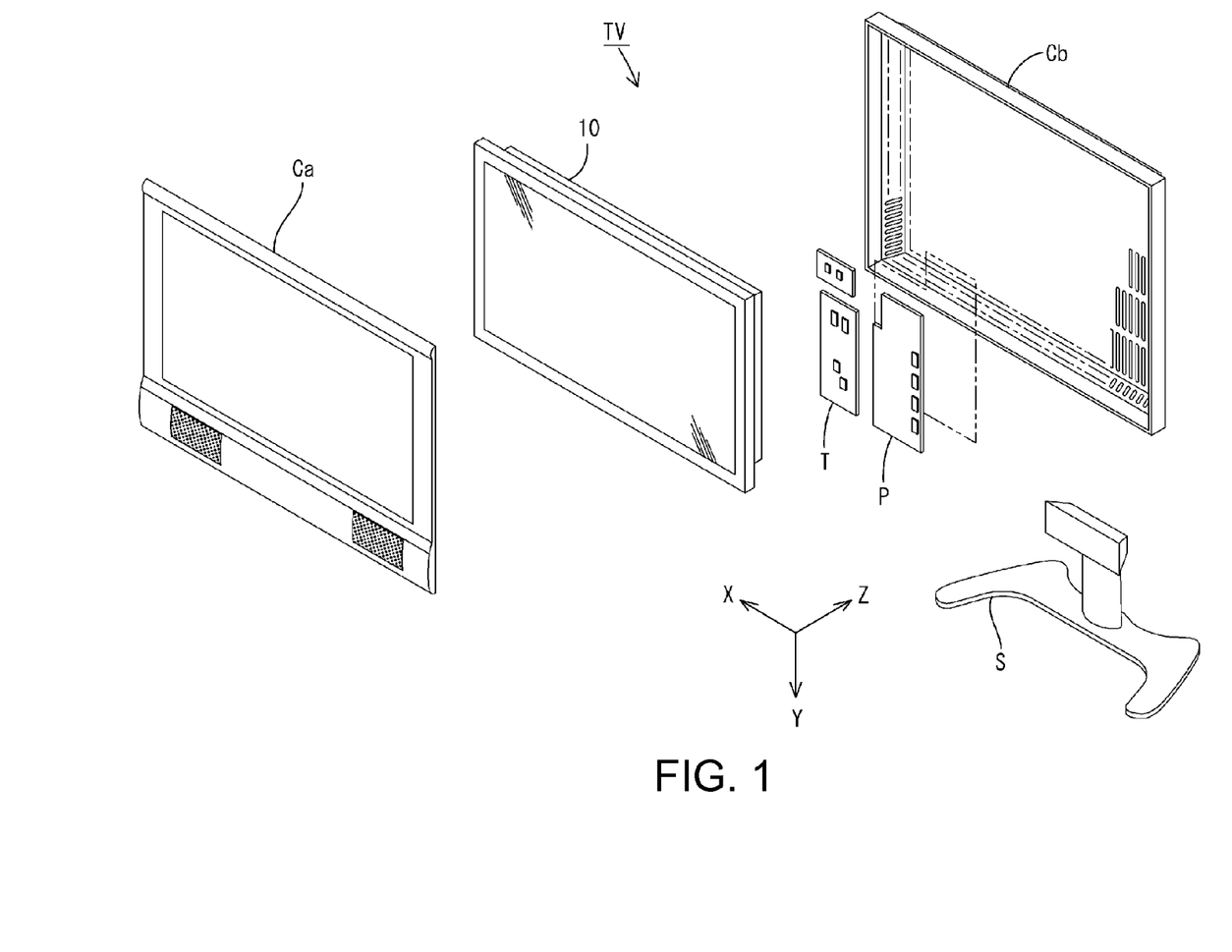
FIG. 1 is an exploded perspective view of a television receiver TV according to Embodiment 1.

FIG. 1 is an exploded perspective view of a television receiver TV according to Embodiment 1. The television receiver TV includes a liquid crystal display device 10, front and rear cabinets Ca and Cb that store the display device D therebetween, a power source P, a tuner T, and a stand S.

Figure 2:
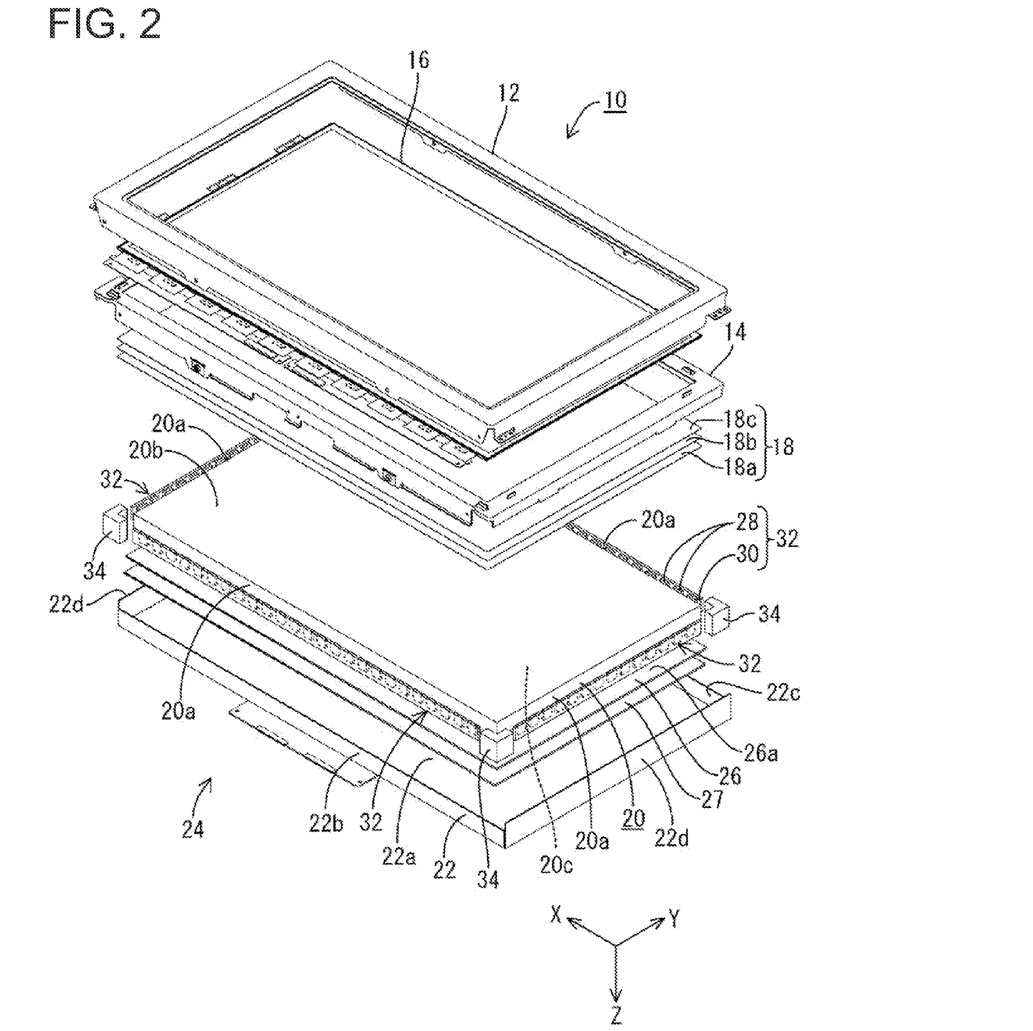
FIG. 2 is an exploded perspective view of a liquid crystal display device 10.

FIG. 2 is an exploded perspective view of the liquid crystal display device 10. The upper side of FIG. 2 is the front side, and the lower side is the rear side. As shown in FIG. 2, the liquid crystal display device 10 is a rectangle that is longer in the horizontal direction as a whole, includes a liquid crystal panel 16, which is a display panel, and a backlight device 24, which is an external light source, and is held together integrally with a frame-shaped bezel 12 or the like.

Next, the liquid crystal panel 16 will be described. In the liquid crystal panel 16, a pair of transparent (having a high light transmission) glass substrates is bonded together with a prescribed gap therebetween, and a liquid crystal layer (not shown in drawings) is sealed between the glass substrates. One of the glass substrates is provided with switching elements (TFTs, for example) connected to source wiring lines and gate wiring lines that intersect perpendicularly, pixel electrodes connected to the switching elements, an alignment film, and the like, while the other glass substrate is provided with color filters in which colored portions (colored R (red), G (green), B (blue), and the like) thereof are disposed in a prescribed arrangement, an opposite electrode, an alignment film, and the like. Of these, the source wiring lines, the gate wiring lines, the opposite electrode, and the like are supplied with image data and various control signals necessary in order to display images from a driver circuit substrate that is not shown in drawings. Polarizing plates (not shown in drawings) are disposed on the outside of the glass substrates.

Figure 3:
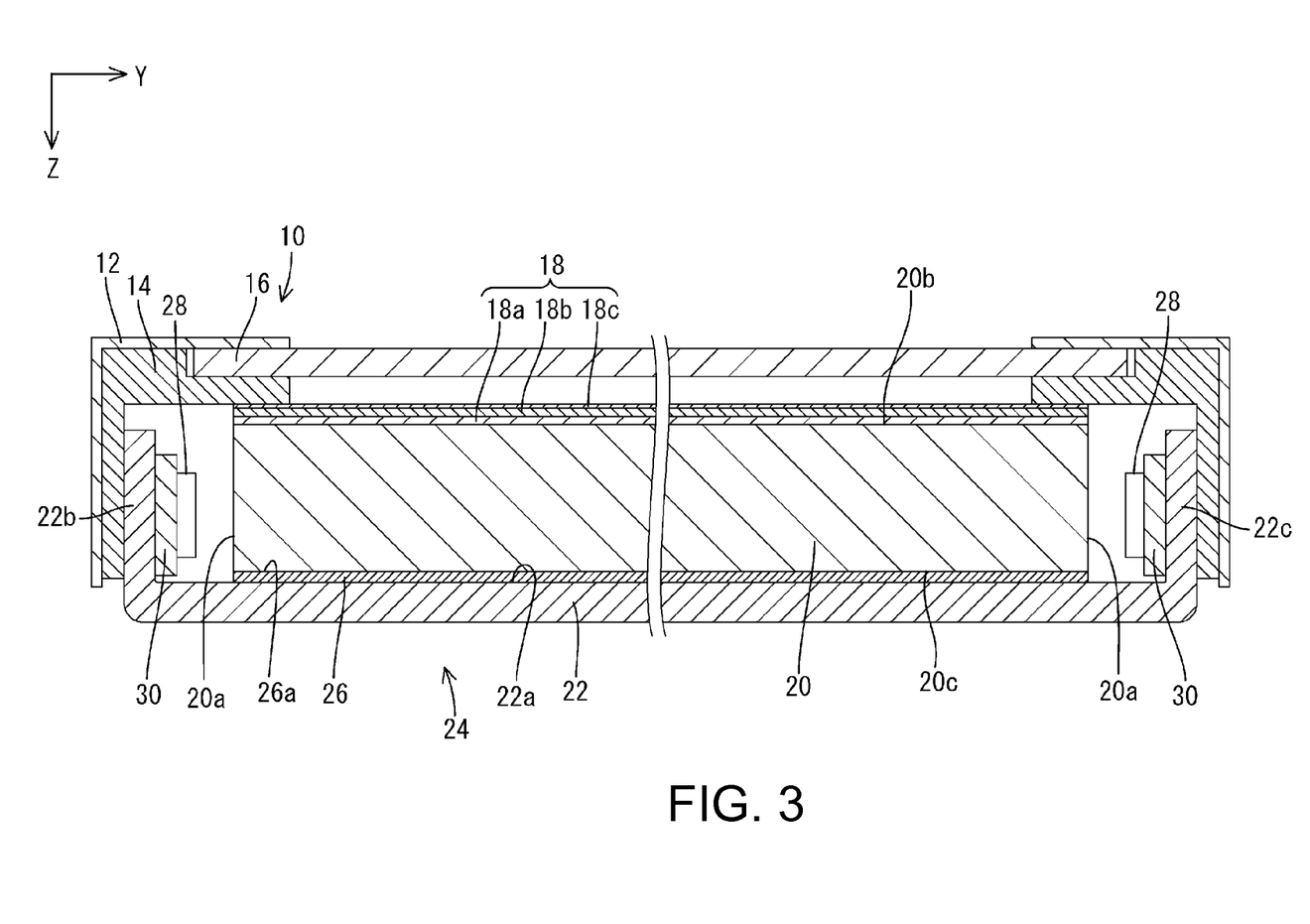
FIG. 3 is a cross-sectional view of the liquid crystal display device 10.

Next, the backlight device 24 will be described. FIG. 3 is a cross-sectional view that shows a cross-section of the liquid crystal display device 10 along the vertical direction (Y axis direction). As shown in FIGS. 2 and 3, the backlight device 24 includes a frame 14, optical members 18, and a chassis 22. The frame 14 has a frame shape and supports the liquid crystal panel 16 along an inner edge thereof. The optical members 18 are placed on the front side (side of the light-emitting surface 20b) of a light guide plate 20. The backlight chassis 22 has a substantially box shape that is open on the front side (side towards which light is emitted/liquid crystal panel 16 side).

LED (light emitting diode) units 32, a reflective sheet 26, a light guide plate 20, and spacer members 34 are stored inside the chassis 22. The LED units 32 are disposed respectively on both long side outer edges (side walls) 22b and 22c, and both short side outer edges (side walls) 22d and 22d of the chassis 22, and emit light. Both lengthwise direction side faces (light-receiving surfaces) 20a and both widthwise direction side faces (light-receiving surfaces) 20a of the light guide plate 20 are respectively disposed at positions facing the LED units 32, such that light emitted from the LED units 32 is guided towards the liquid crystal panel 16. The optical members 18 are placed on the front side of the light guide plate 20. The backlight device 24 according to the present embodiment uses the so-called edge light method (side light method) in which a light guide plate 20 and optical members 18 are disposed directly under the liquid crystal panel 16, and the LED units 32, which are light sources, are disposed around all side faces of the light guide plate 20.

The chassis 22 is made of a metal such as an aluminum-type material, for example, and is constituted of a bottom plate 22a that is rectangular in a plan view, side walls 22b and 22c that rise from the outer edges of the respective long sides of the bottom plate 22a, and side walls 22d and 22d that rise from the outer edges of the respective short sides of the bottom plate 22a. The space in the chassis 22 between the respective LED units 32 is a storage space for the light guide plate 20. On the rear side of the bottom plate 22a, a power source circuit board (not shown in drawings) that supplies power to the LED units 32, and the like are installed.

The optical members 18 include a diffusion sheet 18a, a lens sheet 18b, and a reflective polarizing plate 18c layered in this order from the light guide plate 20. The diffusion sheet 18a, the lens sheet 18b, and the reflective polarizing plate 18c function to convert the light emitted from the LED units 32 and transmitted through the light guide plate 20 into planar light. The liquid crystal panel 16 is disposed on the upper side of the reflective polarizing plate 18c, and the optical members 18 are disposed between the light guide plate 20 and the liquid crystal panel 16.

The LED unit 32 has a configuration in which the LED light sources 28, which emit white light, are aligned in a row on a rectangular LED substrate 30, which is made of resin. The LED substrates 30 are respectively fixed on the side walls 22b, 22c, 22d, and 22d of the chassis 22 by screws or the like. The LED light source 28 may have a configuration in which white light is emitted by having a blue light emitting element coated with a fluorescent material that has a light emitting peak in the yellow region. The LED light source 28 may alternatively have a configuration in which white light is emitted by having a blue light emitting element coated with fluorescent materials that have light emitting peaks in the green region and the red region, respectively. The LED light source 28 may also have a configuration in which white light is emitted by having a blue light emitting element coated with a fluorescent material that has a light emitting peak in the green region, and combining this with a red light emitting element. The LED light source 28 may also have a configuration in which white light is emitted by combining a blue light emitting element, a green light emitting element, and a red light emitting element. The LED light source 28 may also be a combination of an ultraviolet light emitting element with fluorescent materials. In particular, the LED light source 28 may have a configuration in which white light is emitted by having the ultraviolet light emitting element coated with fluorescent materials that have light emitting peaks in the blue, green, and red regions, respectively.

The reflective sheet 26 is made of a synthetic resin and the surface thereof has a white color with excellent light-reflective properties, and is placed on the front side of the bottom plate 22a of the backlight chassis 22. The reflective sheet 26 has a reflective surface on the front side thereof, and the reflective surface is in contact with an opposite surface 20c of the light guide plate 20, thus allowing light that leaks from the LED units 32 and 32 or from the light guide plate 20 to the opposite surface 20c to be reflected.

The light guide plate 20 is a rectangular plate-shaped member formed of a resin of acrylic or the like with a high transmission (high transparency), and is in contact with the reflective sheet 26 and supported by the chassis 22. As shown in FIG. 2, each side face of the light guide plate 20 is a light-receiving surface 20a, and the light guide plate 20 is disposed between the LED units 32, such that the light emitting surface 20b, which is the main plate surface, faces the diffusion sheet 18a, and the opposite surface 20c, which is on a side opposite to the light emitting surface 20b, faces the reflective sheet 26. By providing such a light guide plate 20, light emitted from the LED units 32 enters the light-receiving surfaces 20a of the light guide plate 20 and is outputted from the light emitting surface 20b facing the diffusion sheet 18a, thus illuminating the liquid crystal panel 16 from the rear.

Figure 4:
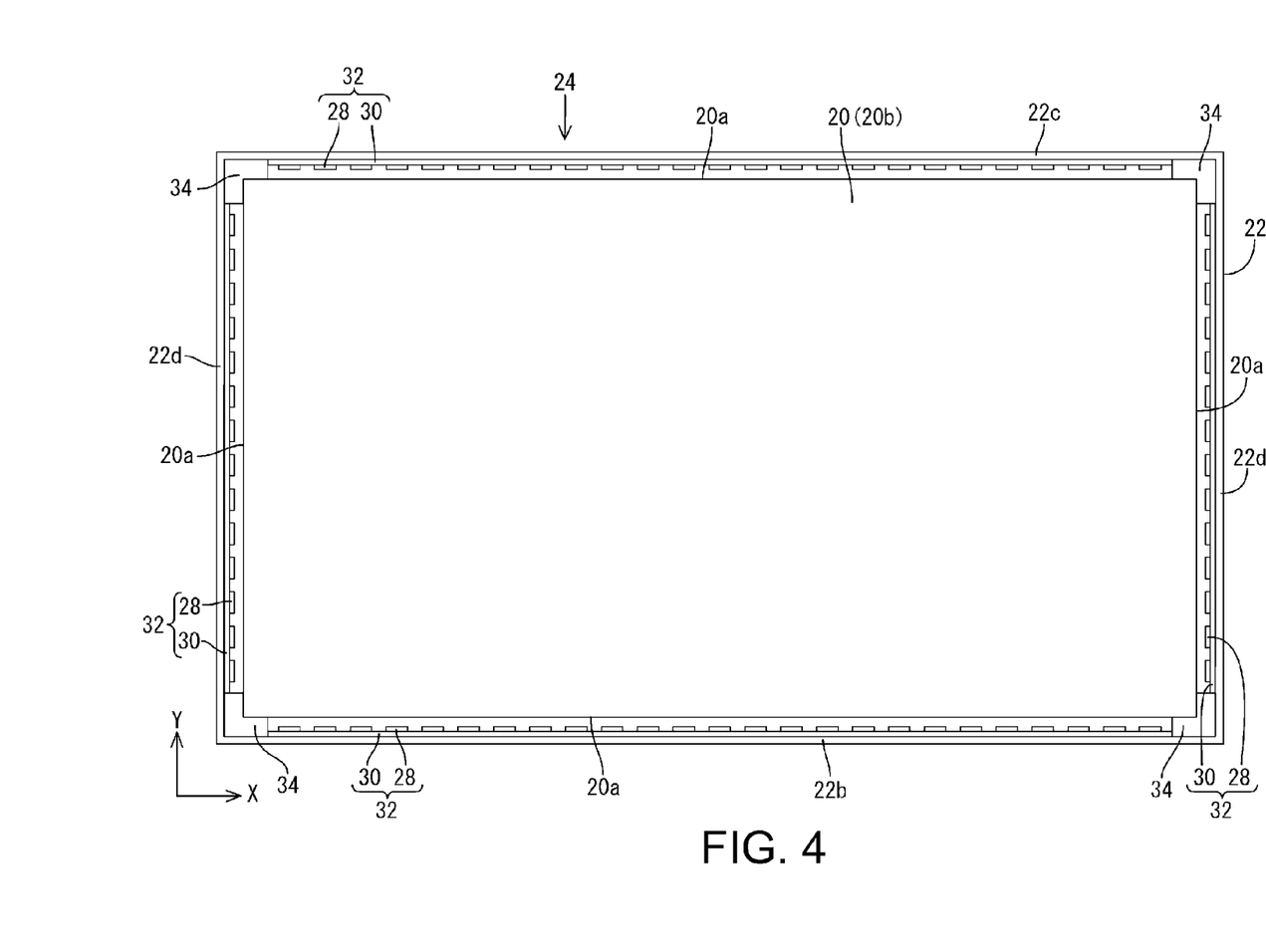
FIG. 4 is a plan view of a backlight device 24.

Next, a configuration for setting the position of the light guide plate 20 will be described. FIG. 4 is a plan view of the backlight device 24. As shown in FIG. 4, the gap between the light guide plate 20 and the respective side walls 22b, 22c, 22d, and 22d of the chassis 22 is set by the spacer members 34 having a substantially L shape in a plan view. The spacer members 34 are made of an elastic material such as a cushion material. Thus, if the light guide plate 20 undergoes thermal expansion, the change in size of the light guide plate 20 due to thermal expansion is elastically absorbed by the spacer members 34, which means the gaps between the light guide plate 20 and the respective side walls 22b, 22c, 22d, and 22d of the chassis 22 are effectively set.

The gap between the light guide plate 20 and the respective side walls 22b, 22c, 22d, and 22d of the chassis 22 is set by the four spacer members 34. The respective spacer members 34 are disposed at the corners between adjacent side walls 22b, 22c, 22d, and 22d of the chassis 22, or in other words, the four corners of the chassis 22. By disposing the spacer members 34 in this manner, the respective spacer members 34 set the gap between the light guide plate 20 and edges of the lengthwise side walls 22b and 22c of the chassis 22 and also the gap between the light guide plate 20 and edges of the widthwise side walls 22d and 22d of the chassis 22. For example, the spacer member 34 disposed on the corner between the right side of the side wall 22c and the upper side of the side wall 22d (upper right of FIG. 4) sets the gap between the right edge of one lengthwise direction side wall (side wall on upper side of FIG. 4) 22c of the chassis 22 and the upper right edge of the light guide plate 20, at the same time as setting the gap between the upper edge of one widthwise direction side wall (side wall on right side of FIG. 4) 22d of the chassis 22 and the upper right edge of the light guide plate 20. Thus, in the backlight device 24 in which LED light sources 28 are disposed along each side face of the light guide plate 20, the gap between the light guide plate 20 and the four LED substrates 30 respectively disposed on the surfaces of the side walls 22b, 22c, 22d, and 22d of the chassis 22 is set by the four spacer members 34. The gaps between the respective side faces 20a of the light guide plate 20 and the respective side walls 22b, 22c, and 22d of the chassis 22 are the same.

Here, if the liquid crystal display device 10 (refer to FIGS. 2 and 3) is used in a vertical orientation, the backlight device 24 is also vertical, which means that the two spacer members 34 on the lower side (lower side of FIG. 4) of the light guide plate 20 are compressed by the weight of the light guide plate 20 being applied thereon, and deform. As a result, the gap widens between the side face 20a on the upper side (upper side of FIG. 4) of the light guide plate 20 and the LED light sources 28 facing the side face 20a, which means that the gaps between the side faces 20a of the light guide plate 20 and the LED light sources 28 are unequal between the upper side and the lower side of the light guide plate 20, causing the light-receiving efficiency to also be unequal. Thus, there is a difference in brightness at the display surface of the liquid crystal panel 16 between the upper side and the lower side of the light guide plate 20. If this difference in brightness is within 5%, it is difficult for human eyes to detect the difference. In the backlight device 24 of the present embodiment, the spacer members 34 are made of an elastic material that deforms by 0.5 mm or less when the weight of the light guide plate 20 compresses the spacer members 34. In general, if the gap between the side face 20a of the light guide plate 20 and the LED light sources 28 widens by 1 mm, then the light-receiving efficiency decreases by 5%. Thus, in the liquid crystal display device 10, by having the spacer members 34 have such an elasticity, it is possible to have the difference in brightness be within 5%, which means that the difference in brightness between the upper side and the lower side of the light guide plate 20 is difficult to perceive. The elastic material used in the spacer members 34 having such elasticity can be appropriately selected based on the weight of the light guide plate 20, the size of the liquid crystal display device 10, or the like.

As described above, in the backlight device 24 of the present embodiment, the gaps between the light guide plate 20 and the respective side walls 22b, 22c, 22d, and 22d of the chassis 22 are respectively controlled by the spacer members 34, which set the position of the light guide plate 22 in the chassis 22. Each spacer member 34 is made of an elastic material, and thus, if the light guide plate 20 undergoes thermal expansion, this change in size in each side face of the light guide plate 20 due to thermal expansion is absorbed by each spacer member 34. In addition, the respective spacer members 34 are disposed at the corners between adjacent side walls, and thus, the LED light sources 28 can be disposed around all side faces of the light guide plate 20, storing the LED light sources 28 between the respective spacer members 34, and thus, it is possible to set the position of the light guide plate 20 using the four spacer members 34. Therefore, it is possible to set the position of the light guide plate 20 with a simple configuration while realizing an edge light-type backlight device 24 in which the LED light sources 28 are disposed around all of the side faces of the light guide plate 20.

The backlight device 24 of the present embodiment has LED units 32 disposed along the respective side faces of the light guide plate 20, and thus, it is possible to attain a high brightness while setting the position of the light guide plate 20.

A conventional technique is known in which position-fixing pins are provided on the bottom plate of the chassis, through holes or grooves are provided in the light guide plate, and the position-fixing pins are inserted into the through holes or grooves of the light guide plate, thereby setting the position of the light guide plate. However, in such a case, the position-fixing pins would result in unevenness, which meant that it was difficult to attain a narrower frame for the backlight device. In the backlight device 24 of the present embodiment, the position of the light guide plate can be set without the use of position-fixing pins, which means that a narrower frame can be achieved for the backlight device 24.

Also, in the backlight device 24 of the present embodiment, the gaps between the respective side faces of the light guide plate and the respective side walls of the storage member are the same, and the spacer members are made of a material that deforms by 0.5 mm or less when the weight of the light guide plate is applied on the spacer members that are provided at the corners on both ends of one side wall. Thus, if the weight of the light guide plate is applied on one set of spacer members, the difference in brightness in the display surface between the spacer members upon which the weight of the light guide plate is applied and the spacer members on the side opposite thereto can be made within 5%, and therefore, difficult to perceive.

Embodiment 2

Figure 5:
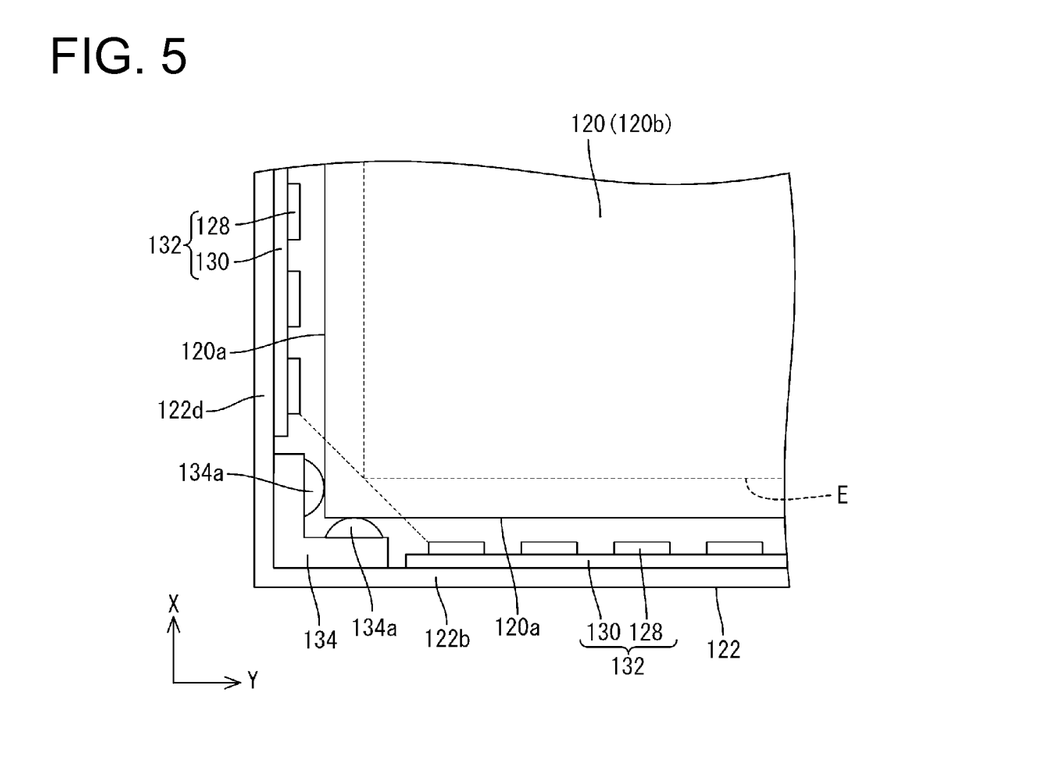
FIG. 5 is a magnified view of a vicinity of one corner of a light guide plate 120 in a plan view of a backlight device according to Embodiment 2.
Figure 6:
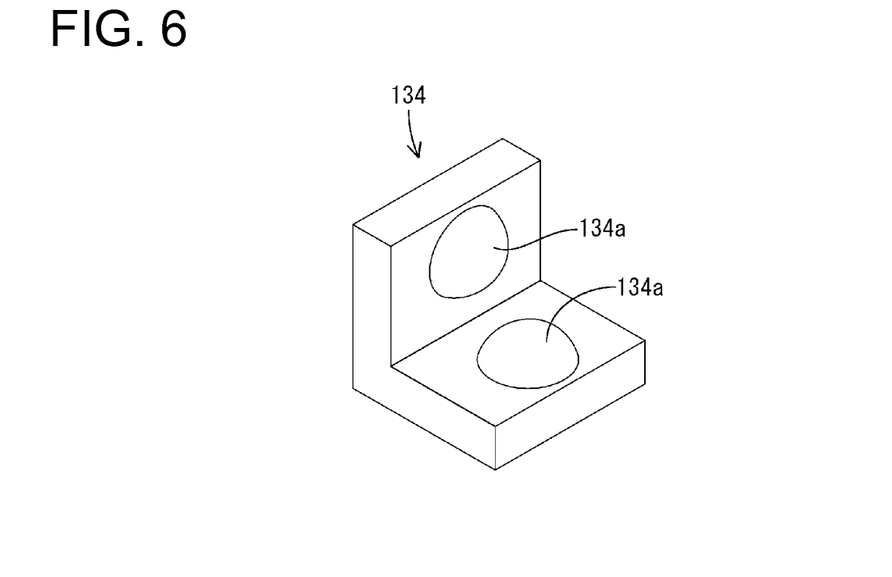
FIG. 6 is a perspective view of a spacer member 134.

Embodiment 2 will be described with reference to the drawings. FIG. 5 is a magnified view of a vicinity of one corner of a light guide plate 120 in a plan view of a backlight device of Embodiment 2. FIG. 6 is a perspective view of a spacer member 134. The reference character "E" in FIG. 5 represents a display area of the backlight device of Embodiment 2. Embodiment 2 differs from Embodiment 1 in that the spacer members 134 have projections 134a that protrude towards the light guide plate 120, and in that the gaps between the side faces 120a of the light guide plate 120 and the side walls 122b, 122c, and 122d of a chassis 122 are different from that of Embodiment 1. Other configurations are similar to those of Embodiment 1, and therefore, descriptions of the configurations, the operation, and the effect will be omitted. In FIG. 5, parts having reference characters with 100 added to the reference characters in the vicinity of a corner in FIG. 4 (FIG. 5 corresponds to the vicinity of the lower left corner of FIG. 4) are the same as the parts described in Embodiment 1.

As shown in FIGS. 5 and 6, in the backlight device of Embodiment 2, the spacer member 134 is provided with projections 134a that protrude towards the light guide plate 120 in portions thereof facing the light guide plate 120. The projections 134a have a partially spherical shape protruding towards the light guide plate 120, and the tips thereof are in contact with the light guide plate 120. If the spacer members 134 are provided with such projections 134a, the area of contact between the spacer members 134 and the light guide plate 120 is decreased because the light guide plate 120 is in contact with the projections 134a of the spacer members 134, which allows the light guide plate 120 to be installed in the space surrounded by the spacer members 134 with ease during the manufacturing process of the backlight device.

In the backlight device of Embodiment 2, the gaps between LED light sources 128 and respective side faces 120a of the light guide plate 120 are 0.3 mm. The spacer members 134 are made of an elastic material such that when the backlight device is vertical due to the liquid crystal display device being used in a vertical orientation, the spacer members 134 on the lower side of the light guide plate 120 have a deformation amount of less than 0.3 mm (gaps between the respective side faces 120a of the light guide plate 120 and the LED light sources 128). Thus, it is possible to prevent or mitigate damage to the LED light sources 128 and the light guide plate 120 due to a side face of the light guide plate 120 and the LED light sources 128 coming into contact on the lower side of the light guide plate 120 (side to which the weight of the light guide plate 120 is applied).

Embodiment 3

Figure 7:
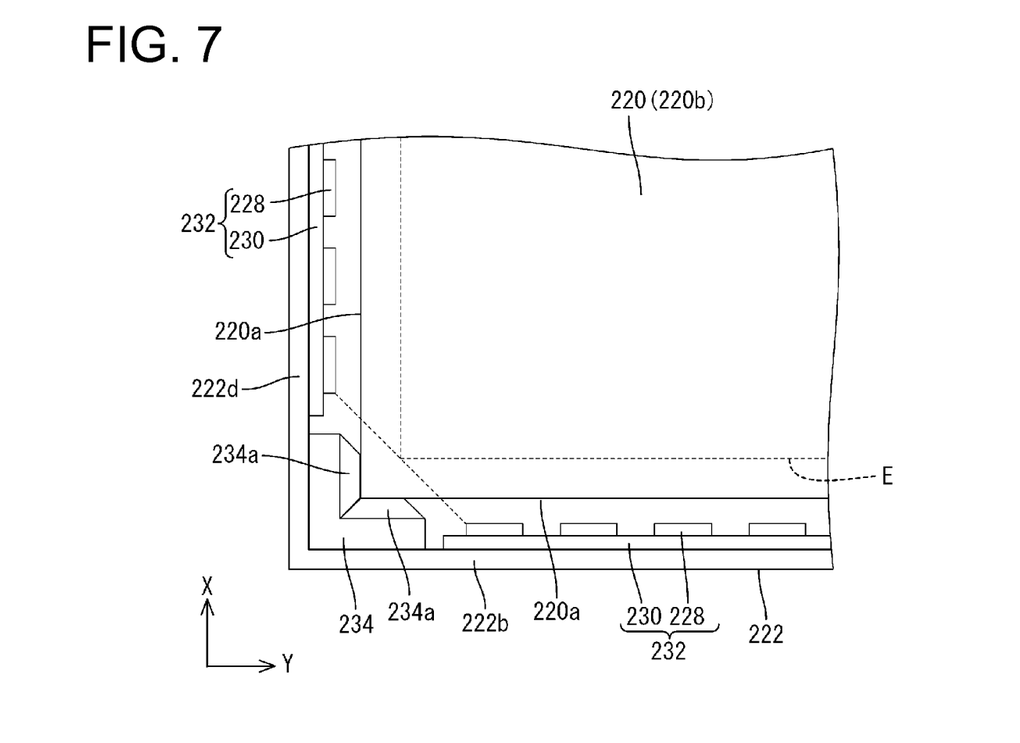
FIG. 7 is a magnified view of a vicinity of one corner of a light guide plate 220 in a plan view of a backlight device according to Embodiment 3.
Figure 8:
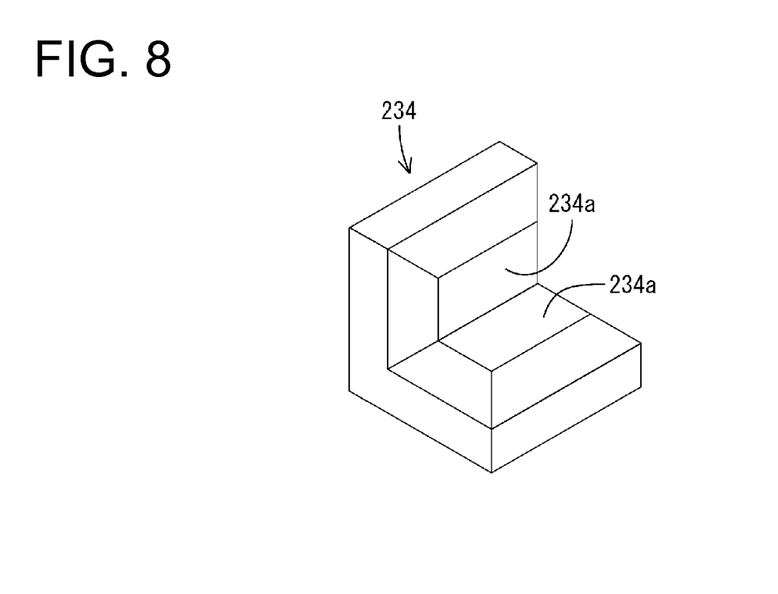
FIG. 8 is a perspective view of a spacer member 234.

Embodiment 3 will be described with reference to the drawings. FIG. 7 is a magnified view of a vicinity of one corner of a light guide plate 220 in a plan view of a backlight device of Embodiment 3. FIG. 8 is a perspective view of a spacer member 234. Embodiment 3 differs from Embodiment 2 in the shape of a projection 234a of a spacer member 234. Other configurations are similar to those of Embodiment 1, and therefore, descriptions of the configurations, the operation, and the effect will be omitted. Parts in FIG. 7 that have 100 added to the reference characters of FIG. 5 are the same as these parts described in Embodiment 2.

As in Embodiment 2, in the backlight device of Embodiment 3, the spacer member 234 is provided with projections 234a that protrude towards the light guide plate 220 in portions thereof facing the light guide plate 220. As shown in FIGS. 7 and 8, the projections 234a have truncated pyramid shapes that protrude towards the light guide plate 220, and the tip areas of the projections 234a are in contact with side faces of the light guide plate 220. As a result, the projections 234a have inclined faces that are inclined respectively from the side walls 222b and 222d of the chassis 222 to the light guide plate 220. Even if the projections 234a have such a shape, the contact area of the light guide plate 220 to the spacer members 234 is decreased by having the projections 234a of the spacer members 234 in contact with the light guide plate 220, which allows the light guide plate 220 to be installed with ease in the space surrounded by the spacer members 234 during the manufacturing process of the backlight device.

The projections 234a have the above-described inclined faces, and thus, during the manufacturing process of the backlight device, the inclined faces can serve as guides for installing the light guide plate 220 when installing the light guide plate 220 in the space surrounded by the spacer members 234. Thus, the light guide plate 220 can be installed with greater ease. The projections 234a have the contact surfaces on the tips thereof in contact with side faces of the light guide plate 220, and thus, it is possible to effectively set the position of the light guide plate 220.

Embodiment 4

Figure 9:
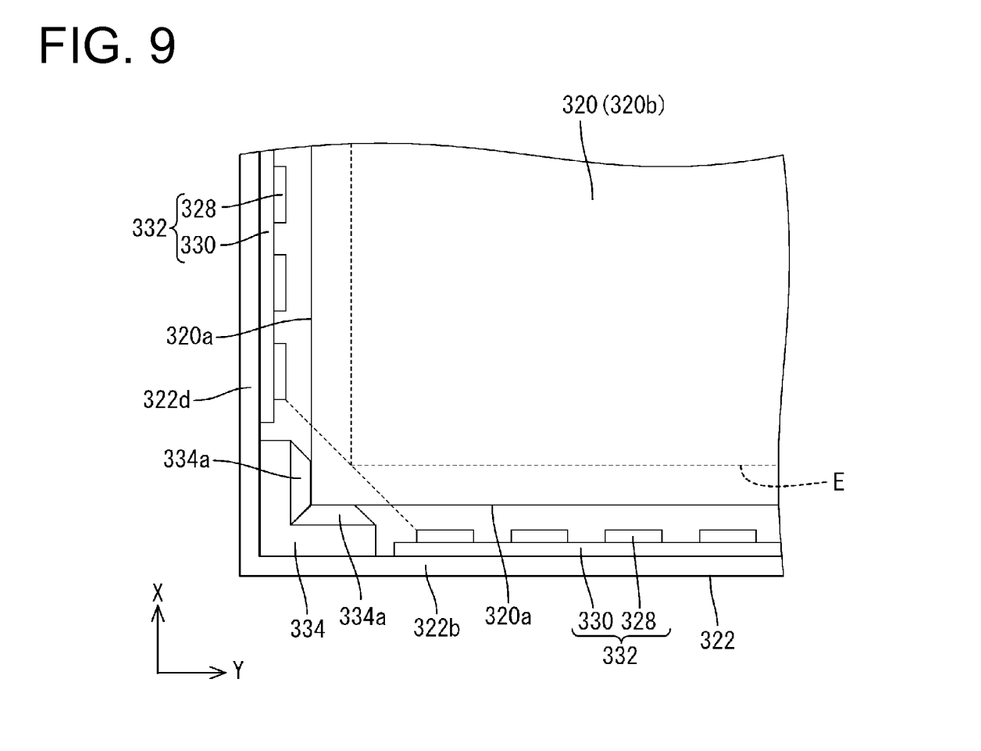
FIG. 9 is a magnified view of a vicinity of one corner of a light guide plate 320 in a plan view of a backlight device according to Embodiment 4.
Figure 10:
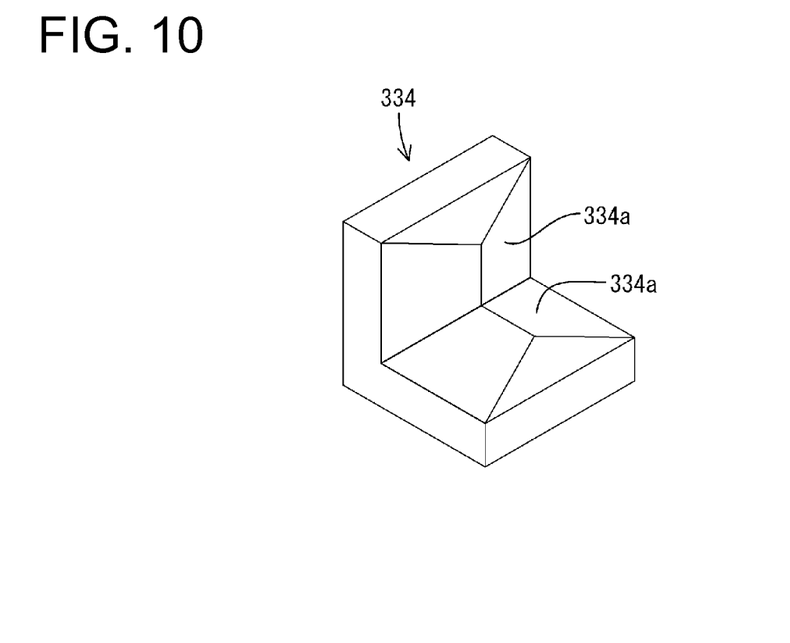
FIG. 10 is a perspective view of a spacer member 334.

Embodiment 4 will be described with reference to the drawings. FIG. 9 is a magnified view of a vicinity of one corner of a light guide plate 320 in a plan view of a backlight device of Embodiment 4. FIG. 10 is a perspective view of a spacer member 334. Embodiment 4 differs from Embodiment 2 in that the shape of a projection 334a of a spacer member 334 is different. Other configurations are similar to those of Embodiment 1, and therefore, descriptions of the configurations, the operation, and the effect will be omitted. Parts in FIG. 9 that have 200 added to the reference characters of FIG. 5 are the same as these parts described in Embodiment 2.

As in Embodiment 2, in the backlight device of Embodiment 4, the spacer member 334 is provided with projections 334a that protrude towards the light guide plate 320 in portions thereof facing the light guide plate 320. As shown in FIGS. 9 and 10, the projections 334a have a triangular prism shape that extends along the side walls 322b and 322d of the chassis 322. The angular tip of the projection 334a is in contact with the light guide plate 320. Even if the projection 334a has such a shape, the contact area of the light guide plate 320 to the spacer members 334 is decreased by having the projections 334a of the spacer members 334 in contact with the light guide plate 320, which allows the light guide plate 320 to be installed with ease in the space surrounded by the spacer members 334 during the manufacturing process of the backlight device.

Embodiment 5

Figure 11:
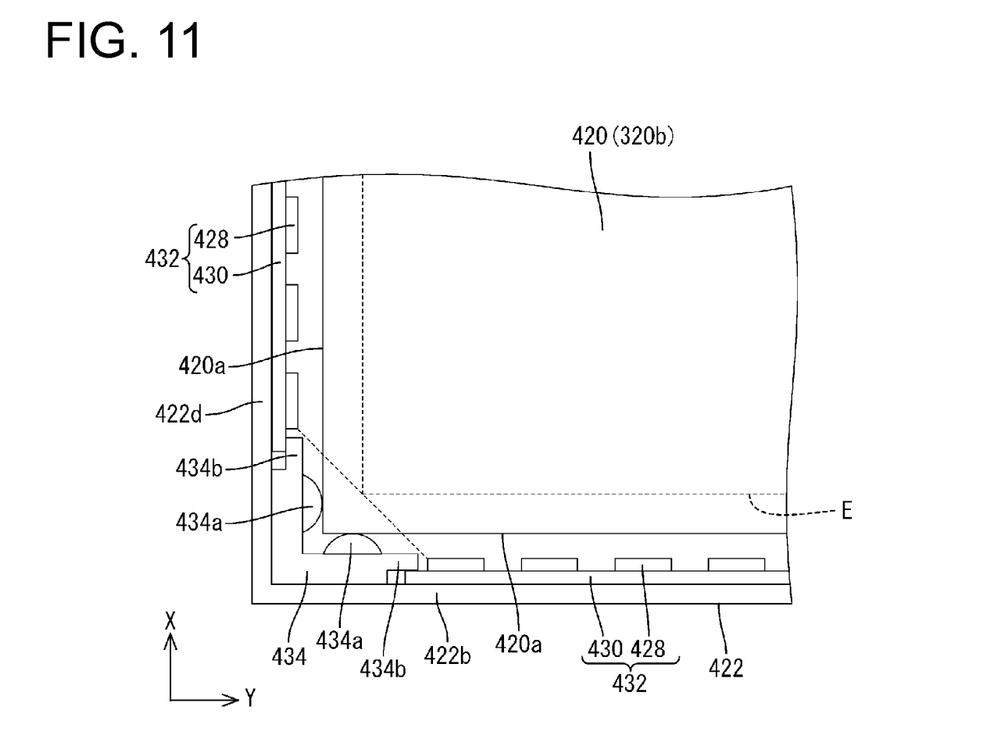
FIG. 11 is a magnified view of a vicinity of one corner of a light guide plate 420 in a plan view of a backlight device 424 according to Embodiment 5.

Embodiment 5 will be described with reference to the drawings. FIG. 11 is a magnified view of a vicinity of one corner of a light guide plate 420 in a plan view of a backlight device 424 of Embodiment 5. Embodiment 5 differs from Embodiment 2 in the shape of a portion of a spacer member 434. Other configurations are similar to those of Embodiment 1 and Embodiment 2, and therefore, descriptions of the configurations, the operation, and the effect will be omitted. Parts in FIG. 11 that have 300 added to the reference characters of FIG. 5 are the same as these parts described in Embodiment 2.

As shown in FIG. 11, in the backlight device of Embodiment 5, both sides of the spacer member 434 (parts thereof facing the LED substrate) are provided with an extension 434b that extends towards a surface of the LED substrate 430. A tip of the extension 434b is in contact with the surface of the LED substrate 430, supporting the LED substrate 430. With the spacer member 434 having such an extension, in the backlight device of Embodiment 5, the spacer member 434 can not only set the position of the light guide plate 420, but can also support the LED substrate 430.

Embodiment 6

Figure 12:
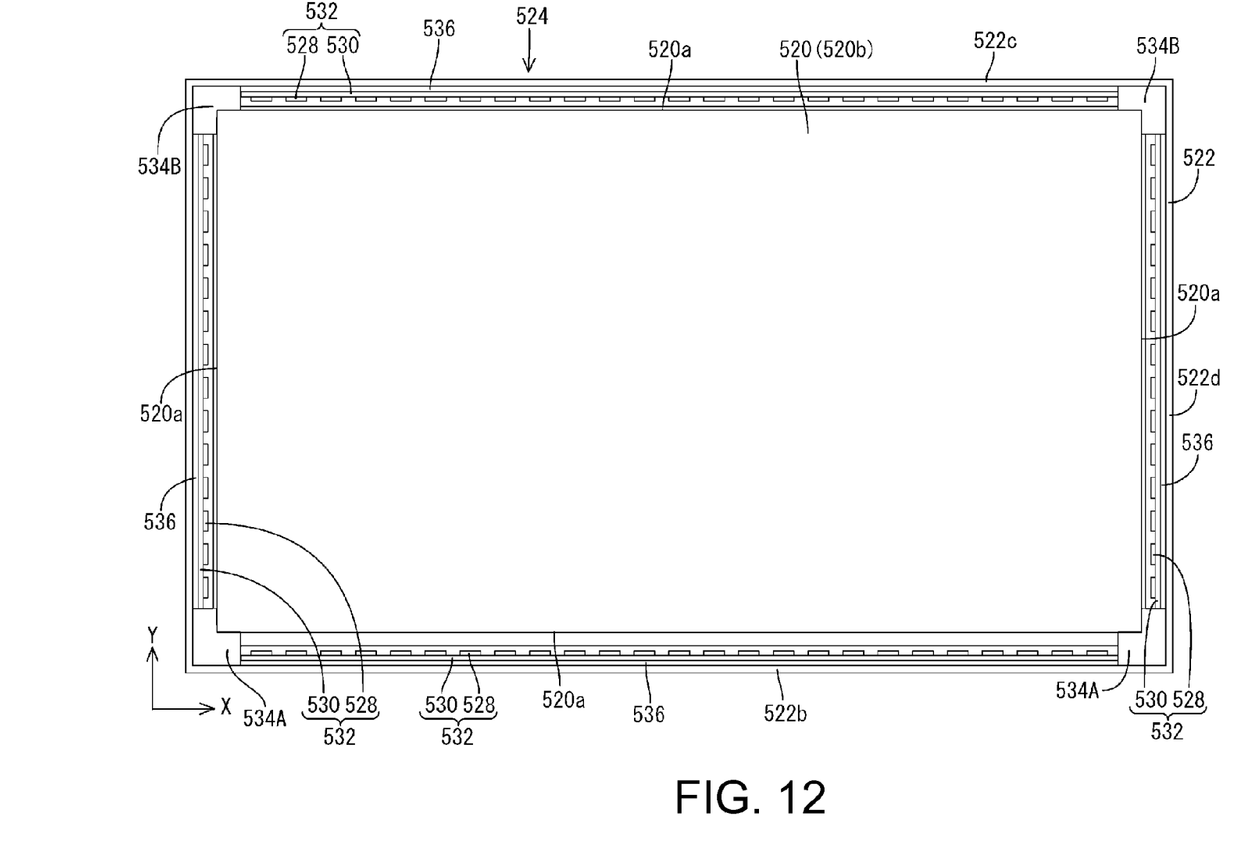
FIG. 12 is a plan view of a backlight device 524 according to Embodiment 6.
Figure 13:
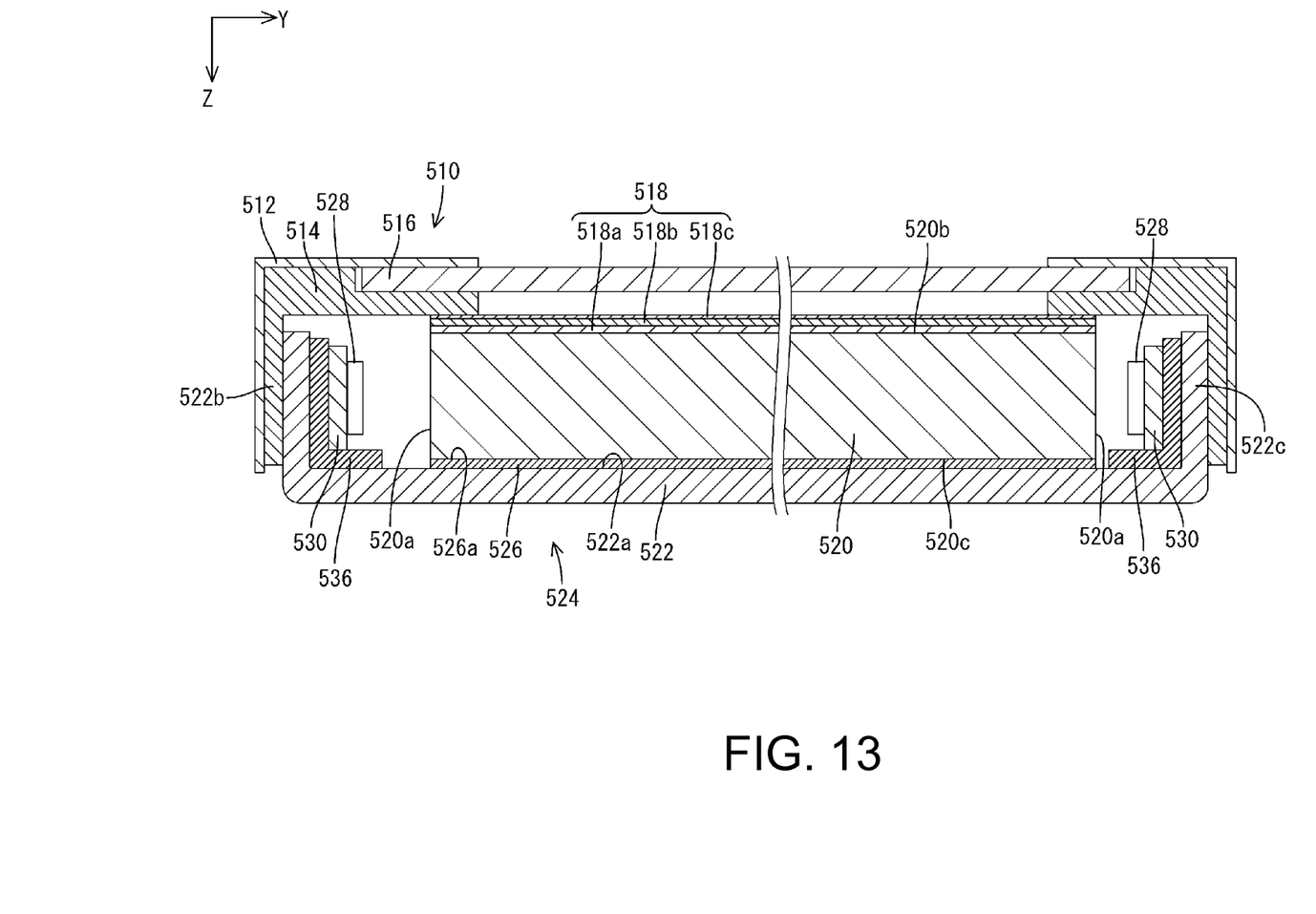
FIG. 13 is a cross-sectional view of a liquid crystal display device 510.

Embodiment 6 will be described with reference to the drawings. FIG. 12 is a plan view of a backlight device 524 of Embodiment 6. FIG. 13 is a cross-sectional view of a liquid crystal display device 510 along the vertical direction (Y axis direction). Embodiment 6 differs from Embodiment 1 in terms of the size of some spacer members 534A and in terms of the support configuration for the LED substrates 530. Other configurations are similar to those of Embodiment 1, and therefore, descriptions of the configurations, the operation, and the effect will be omitted. Parts in FIG. 12 that have 500 added to the reference characters of FIG. 4 are the same as these parts described in Embodiment 1, and parts in FIG. 13 that have 500 added to the reference characters of FIG. 3 are the same as these parts described in Embodiment 1.

As shown in FIG. 12, in the backlight device 524 of Embodiment 6, of the four spacer members 534A and 534B, the size of the two spacer members 534A disposed on the lower side (lower side of FIG. 12) of the light guide plate 520 is different from the size of the two spacer members 534B disposed on the upper side (upper side of FIG. 12) of the light guide plate 520, when the liquid crystal display device 510 (refer to FIG. 13) is used in a vertical orientation and the backlight device 524 is therefore vertical. Below, when the liquid crystal display 510 is used in a vertical orientation and the backlight device 524 is therefore vertical, the two spacer members 534A disposed on the lower side of the light guide plate 520 are referred to as the lower spacer members 534A, and the two spacer members 534B disposed on the upper side of the light guide plate 520 are referred to as the upper spacer members 534B.

The vertical length of the portions of the lower spacer members 534A in contact with one light-receiving surface 520a (on the side of the side wall 522b of the chassis 522) of the light guide plate 520 is greater than the vertical length of the portions of the upper spacer members 534B in contact with one light-receiving surface 520a (on the side of the side wall 522c of the chassis 522) of the light guide plate 520. Thus, even if the weight of the light guide plate is applied on the lower spacer members 534A below the light guide plate 520 when the liquid crystal display device 510 is used in a vertical orientation and the backlight device 524 is therefore vertical, the lower spacer members 534A are ensured a sufficient vertical length to be able to be compressed by the weight of the light guide plate 520. Therefore, it is possible to maintain an even gap between the light guide plate 520 and the LED substrates 530, around the entirety thereof.

As shown in FIGS. 12 and 13, the backlight device 524 according to Embodiment 6 has substrate support members 536 that support the LED substrates 530. The substrate support member 536 has an L shape in a cross-sectional view, and has a surface attached to the bottom plate 522a of the chassis 522 and in contact therewith, and a surface that rises from an edge of the aforementioned surface and to which the LED substrate 530 is attached. In the backlight device 524, it is possible to support the LED substrates 530 with the substrate support members 536 in an excellent manner.

The corresponding relation between the configurations of each embodiment and the configurations of the present invention will be described. LED substrates 30, 130, 230, 330, 430, and 530 are examples of "light source substrates." The LED light sources 28, 128, 228, 328, 428, and 528 are examples of "light sources." The chassis 22, 122, 222, 322, 422, and 522 are examples of "storage members." The backlight devices 24 and 524 are examples of "illumination devices."

Modification examples of each of the embodiments above will be described below.

(1) In the embodiments above, a configuration is used in which the spacer members (excluding the projections) have a substantially L shape in a plan view, but the shape of the spacer member is not limited. Depending on the shape of the spacer members, the ease with which dies and molds are made and the cost thereof change, and thus, the shape may be selected based on necessity.

(2) Besides what was described in the embodiments above, the shape of the projections of the spacer members can be appropriately modified.

(3) Besides what was described in the embodiments above, the shape of the extensions of the spacer members can be appropriately modified.

(4) In the embodiments above, a liquid crystal display device using a liquid crystal panel as a display panel was described, but the present invention is applicable to a display device that uses another type of display panel.

(5) In the embodiments above, a television receiver that includes a tuner was described, but the present invention is also applicable to a display device without a tuner.

Embodiments of the present invention were described above in detail, but these are merely examples, and do not limit the scope defined by the claims. The technical scope defined by the claims includes various modifications of the specific examples described above.

Also, the technical elements described in the present specification or shown in the drawings realize technical utility each on their own or through a combination of various technical elements, and are not limited to the combinations defined by the claims at the time of filing. Also, the techniques described in the present specification or shown in the drawings can accomplish a plurality of objects simultaneously, and each one of the objects on its own has technical utility.

DESCRIPTION OF REFERENCE CHARACTERS

TV television receiver
Ca, Cb cabinet
T tuner
S stand
10, 510 liquid crystal display device
12, 512 bezel
14, 514 frame
16, 516 liquid crystal panel
18, 518 optical member
20, 120, 220, 320, 420, 520 light guide plate
22, 122, 222, 322, 422, 522 chassis
24, 524 backlight device
26, 526 reflective sheet
28, 128, 228, 328, 428, 528 LED light source
30, 130, 230, 330, 430, 530 LED substrate
32, 132, 232, 332, 432, 532 LED unit
34, 134, 234, 334, 434, 534A, 534B spacer member
536 substrate support member

The invention claimed is:

1. An illumination device, comprising:
light source substrates;
light sources disposed on a surface of each of the light source substrates;
a light guide plate having light-receiving surfaces on side faces thereof, the light guide plate being disposed such that the light sources and the light-receiving surfaces face each other;
a storage member having a bottom plate and a plurality of side walls rising upwardly from the bottom plate, the storage member being open on a top side opposite to the bottom plate and storing at least the light source substrates and the light guide plate; and
a plurality of spacer members that are made of an elastic material and that respectively set gaps between the plurality of side walls of the storage member and the light guide plate,
wherein each of the light source substrates is disposed on each inner surface of the plurality of side walls,
wherein the spacer members are disposed at corners of the side walls that are adjacent to each other, wherein projections protruding towards the light guide plate and in contact with said light guide plate are disposed on portions of the spacer members facing the light guide plate, wherein the spacer members have extensions that extend along plate surfaces of the light source substrates, and wherein a portion of each of the extensions is in contact with the surface of each of the light source substrates on which the light sources are disposed, thereby supporting each of the light source substrates together with the corresponding side wall of the storage member.

2. The illumination device according to claim 1, wherein gaps between the respective side faces of the light guide plate and the respective side walls of the storage member are equal, and wherein the spacer members are made of a material having a deformation amount of 0.5 mm or less when a weight of the light guide plate is applied on the spacer members disposed respectively at corners on both ends of one of the side walls.

3. The illumination device according to claim 2, wherein gaps between the respective side faces of the light guide plate and the respective light sources disposed on the respective side walls of the storage member are 0.5 mm or less, and wherein the spacer members are made of a material such that the deformation amount of the spacer members is less than the gaps between the respective side faces of the light guide plate and the respective light sources.

4. The illumination device according to claim 1, wherein the projections have inclined faces that are on a plane inclined from the respective side walls towards the light guide plate.

5. The illumination device according to claim 1, wherein the projections have a contact surface in contact with a surface of the light guide plate.

6. The illumination device according to claim 1, further comprising substrate support members that support the light source substrates.

7. The illumination device according to claim 6, wherein the substrate support members have an L shape in a cross-sectional view.

8. A display device, comprising a display panel that displays images using light from the illumination device according to claim 1.

9. The display device according to claim 8 having an upper and lower direction matching a direction perpendicular to a thickness direction of the light guide plate, wherein a vertical length of the spacer members disposed on a lower side of the light guide plate is greater than a vertical length of the spacer members disposed on an upper side of the light guide plate.

10. The display device according to claim 8, wherein the display panel is a liquid crystal panel using liquid crystal.

11. A television receiver, comprising the display device according to claim 8.

* * * * *